(12) United States Patent
Zhao et al.

(10) Patent No.: US 10,835,841 B2
(45) Date of Patent: Nov. 17, 2020

(54) IMPACTING T-JUNCTION COMPONENT REGULATOR FOR REGULATING COMPONENTS OF NON-AZEOTROPIC WORKING MEDIUM

(71) Applicant: TIANJIN UNIVERSITY, Tianjin (CN)

(72) Inventors: Li Zhao, Tianjin (CN); Wen Su, Tianjin (CN); Nan Zheng, Tianjin (CN); Shuai Deng, Tianjin (CN); Pei Lu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 128 days.

(21) Appl. No.: 16/086,848

(22) PCT Filed: Oct. 27, 2016

(86) PCT No.: PCT/CN2016/103522
§ 371 (c)(1),
(2) Date: Sep. 20, 2018

(87) PCT Pub. No.: WO2017/197838
PCT Pub. Date: Nov. 23, 2017

(65) Prior Publication Data
US 2019/0099698 A1    Apr. 4, 2019

(30) Foreign Application Priority Data
May 18, 2016 (CN) .......................... 2016 1 0330695

(51) Int. Cl.
*B01D 19/00* (2006.01)
*F25B 43/00* (2006.01)
(Continued)

(52) U.S. Cl.
CPC ......... *B01D 19/0042* (2013.01); *B01D 19/00* (2013.01); *B01D 19/0063* (2013.01);
(Continued)

(58) Field of Classification Search
CPC .......................... B01D 19/00; B01D 19/0042; B01D 19/0063; B01D 19/0068; B01D 19/0073;
(Continued)

(56) References Cited

U.S. PATENT DOCUMENTS

| 5,551,469 A | 9/1996 | Woerheide |
| 6,149,825 A | 11/2000 | Gargas |
| 6,250,131 B1 | 6/2001 | Pauley et al. |

FOREIGN PATENT DOCUMENTS

| CN | 101402004 | 4/2009 |
| CN | 101554541 | 10/2009 |

(Continued)

OTHER PUBLICATIONS

CN102580354A_ENG (Espacenet machine translation of Yang) (Year: 2012).*

(Continued)

*Primary Examiner* — In Suk C Bullock
*Assistant Examiner* — Gabriel E Gitman
(74) *Attorney, Agent, or Firm* — Dragon Sun Law Firm, PC; Jinggao Li, Esq.

(57) ABSTRACT

The present disclosure discloses an impacting T-junction component regulator for regulating components of a non-azeotropic working medium, which is formed by connecting a single T-junction or a plurality of T-junctions. Each of the T-junction comprises an inlet pipe and an outlet pipe. When the impacting T-junction component regulator is formed by a plurality of connected T-junctions, the impacting T-junction component regulator further comprises an upper manifold trunk communicated with an outlet pipe of each T-junction and throttle valves located between two adjacent T-junctions. By using the characteristics of unequal vapor and liquid components of the non-azeotropic working medium and mal-distribution of two phase flows by vertical (Continued)

impacting T-junctions, the regulator achieves the fluid flowing through a plurality of T-junctions and throttle valves once so as to achieve the purpose of separating components.

4 Claims, 8 Drawing Sheets

(51) Int. Cl.
   *F25B 41/00*    (2006.01)
   *F25B 23/00*    (2006.01)
   *F25B 43/04*    (2006.01)

(52) U.S. Cl.
   CPC ..... *B01D 19/0068* (2013.01); *B01D 19/0073* (2013.01); *F25B 23/006* (2013.01); *F25B 41/003* (2013.01); *F25B 43/00* (2013.01); *F25B 43/04* (2013.01)

(58) Field of Classification Search
   CPC ........ B01D 45/08; B01D 17/02; B01D 43/00; B01D 49/00; F25B 23/006; F25B 41/003; F25B 43/00; F25B 43/04
   See application file for complete search history.

(56) References Cited

FOREIGN PATENT DOCUMENTS

| CN | 102580354 |   | 7/2012 |   |
|---|---|---|---|---|
| CN | 102580354 A | * | 7/2012 | ............. B01D 17/02 |
| CN | 103845960 |   | 6/2014 |   |
| CN | 105972880 |   | 6/2016 |   |
| CN | 205784060 |   | 12/2016 |   |
| JP | 2010210142 |   | 9/2010 |   |
| WO | 2007006289 |   | 1/2007 |   |

OTHER PUBLICATIONS

Tuo, H., & Hrnjak, P. (2014). Vapor—liquid separation in a vertical impact T-junction for vapor compression systems with flash gas bypass. International journal of refrigeration, 40, 189-200. (Year: 2014).*

Tuo, H., & Hrnjak, P. (2014). Vapor-liquid separation in a vertical impact T-junction for vapor compression systems with flash gas bypass. International journal of refrigeration, 40, 189-200. (Year: 2012).*

Search Report of PCT/CN2016/103522.

Vapor-Liquid Separation in a vertical impact T-junction for vapor compression systems with flash gas bypass/Publication Date—Apr. 30, 2014.

Transient effects in gas-liquid phase separation at a pair of T-junctions/Publication Date—Feb. 28, 2008.

The First Office Action from SIPO for CN patent application No. 201610330695.9.

Written opinion of PCT/CN2016/103522.

\* cited by examiner

IMPACTING T-JUNCTION COMPONENT REGULATOR FOR REGULATING COMPONENTS OF NON-AZEOTROPIC WORKING MEDIUM

CROSS-REFERENCE TO RELATED APPLICATIONS

This application claims priority from PCT Application No. PCT/CN2016/103522, filed Oct. 27, 2016 and CN Application No. CN 201610330695.9, filed May 18, 2016, the contents of which are incorporated herein in the entirety by reference.

Some references, which may include patents, patent applications, and various publications, are cited and discussed in the description of the present invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

TECHNICAL FIELD

The present disclosure relates to the technical field of multiphase flow separation, in particular to a device and method for separating components of a non-azeotropic working medium.

BACKGROUND OF THE PRESENT DISCLOSURE

Thermodynamic cycle, such as organic Rankine cycle, refrigeration or heat pump, is a main technical means for the conversion of heat into power. Therefore, the key point to realize energy conversion and emission reduction is to continuously improve the technical level of energy transfer and conversion in a thermodynamic system. In order to improve the operation efficiency of an actual thermodynamic system under the off-load condition, the non-azeotropic working medium is recommended due to the corresponding cycle characteristics. The proportion of components in the thermodynamic system can be continuously adjusted by a component regulation technology, so as to realize the variable-load regulation of the thermodynamic system.

Based on the phase equilibrium theory of the non-azeotropic working medium, the concentration of a component with a higher boiling point in a vapor phase is less than the one in a liquid phase, and the concentration of a component with a lower boiling point in the vapor phase is greater than the one in the liquid phase. Therefore, conventional component regulation devices, namely vapor-liquid separators (e.g., a separation tank), can adjust the circulation concentration of components in the thermodynamic system according to the concentration difference of components between the vapor phase and the liquid phase. However, such devices can only obtain the concentration of the components in the vapor phase or the liquid phase, but cannot obtain the concentration between the both or even expand the component regulation to the range beyond the concentration of components in the vapor/liquid phases. Meanwhile, the conventional component regulation device is large in size, high in investment, and inconvenient for installation, updating and maintenance in the thermodynamic system.

As one of common tubes for flow distribution, as early as 1960s, it was reported that phase separation could be realized when a two-phase flow with vapor and liquid phases flowed through a T-junction. Chinese Patent No. CN200910029249.4 entitled COMBINED T-JUNCTION SEPARATOR FOR SEPARATING MULTI-PHASE FLOW AND SEPARATION METHOD THEREOF and Patent No. CN201210015904.2 entitled MULTILAYER COMBINED T-JUNCTION TUBE SEPARATOR FOR SEPARATING TWO-PHASE FLOW OR MULTI-PHASE FLOW adopt combined multilayer branch T-junctions to improve the separation efficiency of the two-phase flow with vapor and liquid phases. In 2016, based on the characteristics of mal-distribution of vapor and liquid phases in a T-junction and unequal concentration of the non-azeotropic working medium in vapor and liquid phases, Professor ZHAO Li from Tianjin University (Zheng N, Hwang Y b, Zhao L, Deng S. Experimental study on the distribution of constituents of binary zeotropic mixtures in vertical impacting T-junction[J]. International Journal of Heat and Mass Transfer, 97(1), 242-252) reported the basic mechanism of realizing continuous component regulation by impacting T-junctions. For a single T-junction, it can achieve the continuous concentration regulation of components between the vapor composition and the liquid composition. In order to expand the range of component regulation, the present disclosure adopts the combined T-junction regulation technology, so that the impacting T-junction component separation technology has the potential to be applied to large-scale industries.

SUMMARY OF THE PRESENT DISCLOSURE

A technical problem to be solved by the present disclosure is as follows: by using the characteristics of uneven distribution of vapor and liquid phases in a T-junction and concentration difference of the non-azeotropic working medium between vapor and liquid phases, the present disclosure provides an impacting T-junction regulator for continuously regulating components within a large range and a regulation method thereof, solving the technical problem that existing component regulators can only obtain the proportion of vapor and liquid components in a mixture.

To solve the above technical problem, the present disclosure provides an impacting T-junction component regulator for regulating components of a non-azeotropic working medium. The T-junction comprises an inlet pipe arranged horizontally and an outlet pipe intersected and communicated with the inlet pipe, wherein the outlet pipe includes an upper outlet pipe section located above the inlet pipe and a lower outlet pipe section located below the inlet pipe; one end of the inlet pipe is a mixture inlet, while the other end thereof is communicated with the outlet pipe; an upper port of the upper outlet pipe section is an upper outlet, while a lower port of the lower outlet pipe section is a lower outlet; and, the non-azeotropic working medium flowing from the inlet pipe is divided into two branches, one of which is a rich-liquid phase of the non-azeotropic working medium that flows out from the lower outlet of the lower outlet pipe section and the other one thereof is a rich-vapor phase of the non-azeotropic working medium that is discharged from the upper outlet of the upper outlet pipe section.

In the impacting T-junction component regulator for regulating components of a non-azeotropic working medium, the inlet pipe arranged horizontally is connected to a delivery pipe for the vapor-liquid mixtures, the upper outlet and the lower outlet are connected to two outlet pipes, respectively, regulating valves are installed on the two output pipes, respectively, and the component separation of the mixture can be realized by regulating the mass flow ratio of the mixture outlets via the regulating valves.

Based on the impacting T-junction component regulator of the present disclosure, the component regulator may comprise a plurality of T-junctions and include a T-junction array comprising two or more connected T-junctions, wherein a lower outlet of a T-junction placed in the front of the T-junction array is connected to a mixture inlet of a T-junction connected thereto, and the upper outlet of each T-junction is communicated with an upper manifold trunk; a mixture inlet of an inlet pipe of the T-junction located at the forefront is a mixture inlet of the regulator, and a lower port of a lower outlet pipe section of the last T-junction is a rich-liquid phase outlet of the regulator; one end of the manifold trunk is connected to an upper outlet of an upper outlet pipe section of a T-junction at one end of the T-junction array, while the other end thereof is a rich-vapor phase outlet of the regulator; and, after the non-azeotropic working medium enters the inlet pipe of one T-junction via the mixture inlet of the regulator, the working medium is divided into two branches, one of which is a rich-liquid phase of the non-azeotropic working medium which successively flows through the lower outlet of each T-junction and then flows out from the rich-liquid phase outlet of the regulator, and the other one of which is a rich-vapor phase of the non-azeotropic working medium which is discharged from the upper outlet, then gathered by the upper manifold trunk and discharged from the rich-vapor phase outlet of the regulator.

Further, between two adjacent T-tubes, a throttle valve is provided at a junction of the lower outlet pipe section of the front T-junction and the inlet pipe of the rear T-junction. By regulating the throttle valve between two adjacent T-junctions, the range of component regulation can be expanded.

The rich-liquid phase outlet of the regulator is connected to a lower outlet pipe in a horizontal direction of the liquid phase outlet, and the rich-vapor phase outlet of the regulator is connected to an upper outlet pipe having an upward opening.

Compared with the prior art, the regulator of the present disclosure is simple in structure, small in size and low in cost, and can realize continuous component regulation. Meanwhile, since the regulator is a tubular device, the regulator of the present disclosure can be mounted on a pipeline for realizing component separation, and it is more convenient for maintenance and replacement.

BRIEF DESCRIPTION OF THE DRAWINGS

FIG. 8 is a vapor-liquid phase equilibrium diagram of the non-azeotropic working medium R134a/R245fa; in which:

| | |
|---|---|
| 1: inlet; | 2: inlet pipe; |
| 3: upper manifold trunk; | 4: intermediate connecting pipe; |
| 5: throttle pipe; | 6: lower outlet pipe; |
| 7: lower outlet; | 8: upper outlet; |
| 9: upper outlet pipe; | 10: filter; |
| 11: working medium pump; | 12: main mass flow meter; |
| 13: electrically-heated evaporator; | 14: upper outlet condenser; |
| 15: upper outlet mass flow meter; | 16: upper outlet valve; |
| 17: lower outlet condenser; | 18: lower outlet mass flow meter; |
| 19: lower outlet valve; | 20: main condenser; and |
| 21: liquid storage tank. | |

DETAILED DESCRIPTION OF THE PRESENT DISCLOSURE

The technical solutions of the present disclosure will be further described below in detail by specific embodiments with reference to the accompanying drawings. The specific embodiments described herein are merely for explaining the present disclosure and not intended to limit the present disclosure.

The impacting T-junction component regulator for regulating components of a non-azeotropic working medium in the present disclosure comprises a single T-junction or a plurality of connected T-junctions. Each T-junction mainly comprises an inlet pipe and an outlet pipe. When the component regulator comprises a plurality of connected T-junctions, the component regulator further includes an upper manifold trunk 3 and throttle valves located between two adjacent T-junctions. The pipes may be equal or unequal in diameter, and the pipes may be circular pipes, square pipes or pipes in other shapes in cross-section. The component regulator includes a mixture inlet and two mixture outlets. Vapor and liquid phases of the non-azeotropic working medium flow to the component regulators from a horizontal inlet pipe, the rich-liquid phase with more heavy components flows out from the lower outlet pipe, and the rich-vapor phase with more light components flows out from the upper outlet pipe. For a single T-junction, the continuous regulation of the proportion of vapor and liquid components can be realized as follows: the components of the non-azeotropic working medium flowing from the horizontal inlet pipe 2 will be separated in a vertical direction after impacted on the T-junction, the rich-liquid phase with more heavy components flows out from a lower outlet 7, and the rich-vapor phase with more light components is discharged from an upper outlet 8. The mass flow ratio of the mixture at the upper and lower outlets may controlled by valves connected to the two outlet pipes.

Figure 1:
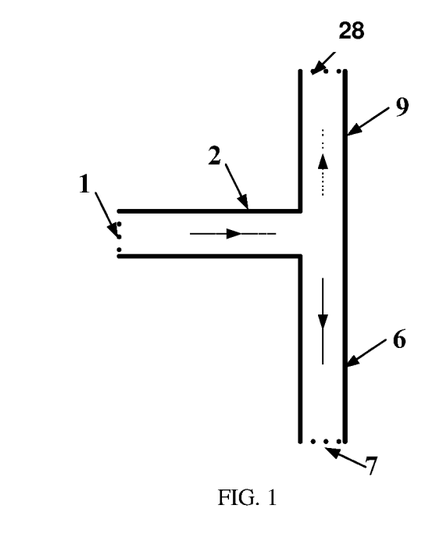
FIG. 1 is a schematic diagram of a component regulator comprising a single T-junction.

As shown in FIG. 1, the present disclosure provides an impacting T-junction component regulator for regulating a non-azeotropic working medium, which comprises an inlet pipe 2 arranged horizontally and an outlet pipe intersected and communicated with the inlet pipe 2. The outlet pipe includes an upper outlet pipe section 9 located above the inlet pipe 2 and a lower outlet pipe section 6 located below the inlet pipe 2. One end of the inlet pipe 2 is a mixture inlet 1, while the other end thereof is communicated with the outlet pipe. An upper port of the upper outlet pipe section 9 is an upper outlet 28, while a lower port of the lower outlet pipe section 6 is a lower outlet 7. The non-azeotropic working medium flowing from the inlet pipe 2 is divided into two branches, one of which is a rich-liquid phase (generally containing a small amount of the vapor phase) of the non-azeotropic working medium that flows out from the lower outlet 7 of the lower outlet pipe section 6 and the other one thereof is a rich-vapor phase (generally containing a small amount of the liquid phase) of the non-azeotropic working medium that is discharged from each upper outlet 28 of the upper outlet pipe section 9.

Figure 2:
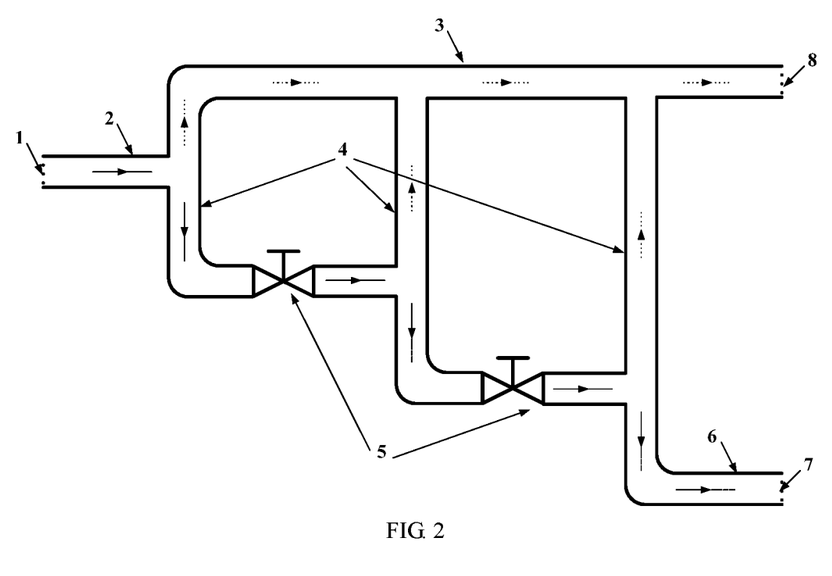
FIG. 2 is a schematic diagram of Embodiment 1 of a component regulator comprising a combined T-junctions.

FIG. 2 shows an Embodiment 1 of an impacting T-junction component regulator of the present disclosure which comprises a plurality of T-junctions shown in FIG. 1. Structurally, the component regulator includes a T-junction array comprising two or more connected T-junctions; wherein a lower outlet 7 of a T-junction placed in the front of the T-junction array is connected to a mixture inlet 1 of a T-junction connected thereto, and the upper outlet of each T-junction is communicated with an upper manifold trunk 3; a mixture inlet 1 of an inlet pipe 2 of the T-junction located at the forefront is a mixture inlet of the regulator, and a lower port of a lower outlet pipe section 6 of the last T-junction is a rich-liquid phase outlet of the regulator. The rich-liquid phase outlet of the regulator is connected to a lower outlet pipe in a horizontal direction. Between two adjacent T-junctions, a throttle valve 5 is provided at a junction of the lower outlet pipe section 6 of the front T-junction and the inlet pipe 2 of the rear T-junction. One end of the manifold trunk 3 is connected to an upper outlet of an upper outlet pipe section of a T-junction at one end of the T-junction array, while the other end thereof is a rich-vapor phase outlet 8 of the regulator; and, after the non-azeotropic working medium enters the inlet pipe of one T-junction via the mixture inlet of the regulator, the working medium is divided into two branches, one of which is a rich-liquid phase of the non-azeotropic working medium which successively flows through the lower outlet of each T-junction and then flows out from the liquid phase outlet 7 of the regulator, and the other is discharged from each upper outlet, then gathered by the upper manifold trunk 3 and discharged from the rich-vapor phase outlet 8 of the regulator. The working medium at the lower outlet of each T-junction is throttled and depressurized by the throttle valve so as to change the proportion of the vapor and liquid components, and the proportion of the components will be further regulated in the next T-junction. The working medium at each upper outlet flows out from the manifold trunk. Compared with a single T-junction, combined T-junctions may continuously change the proportion of the vapor and liquid components and continuously separate the components, so that the range of component regulation is expanded, and the concentration of a certain component is condensed.

The horizontal inlet of the single-T-junction regulator or the combined T-junctions regulator is connected to a delivery pipe for a non-azeotropic working medium with vapor and liquid phases in a thermodynamic system, two outlets of the T-junction are connected to two outlet pipes, respectively, and valves for regulating flow are provided on the pipes. For a single T-junction, the distribution proportion of the mixture outlets can be regulated by the valves on the two outlet pipes, components of the working medium may be separated under a proper distribution proportion. For combined T-junctions, the proportion of vapor and liquid components can be regulated by regulating the throttle valves on the throttle pipes, and the components are separated for multiple times. Under certain control conditions, the non-azeotropic working medium can be separated efficiently by the device of the present disclosure.

Figure 3:
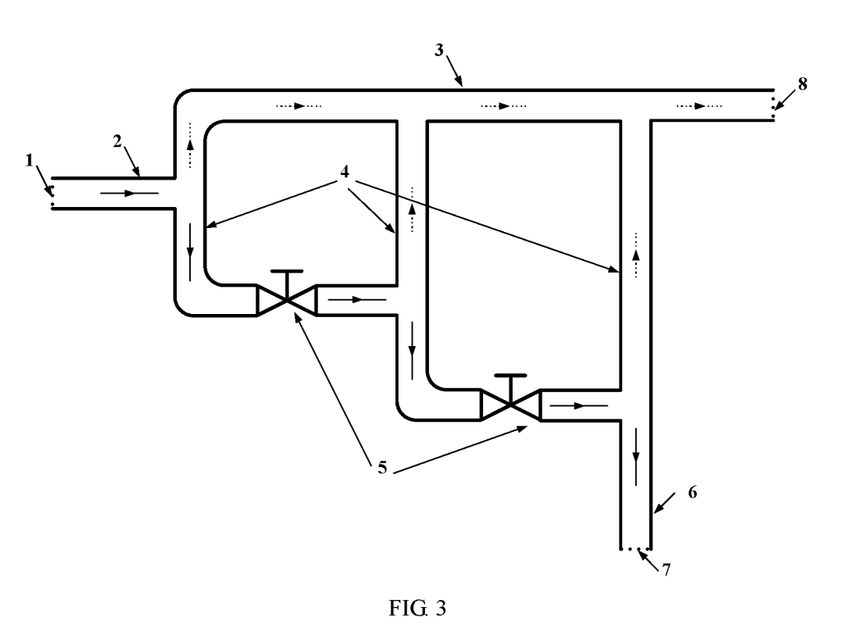
FIG. 3 is a schematic diagram of Embodiment 2 of the component regulator comprising a combined T-junctions.

FIG. 3 shows an Embodiment 2 of the impacting T-junction component regulator of the present disclosure which comprises a plurality of T-junctions shown in FIG. 1. The component regulator in this embodiment is a derivative structure of the component regulator in Embodiment 1, the structure of which is basically the same as the component regulator in Embodiment 1, except for a difference that the rich-liquid phase outlet of the component regulator, e.g. the a lower outlet of the last T-junction, arranged downward perpendicularly in order to facilitate the connection to a pipe arranged perpendicularly in the thermodynamic system. The separation mechanism in Embodiment 2 is the same as that in Embodiment 1.

Figure 4:
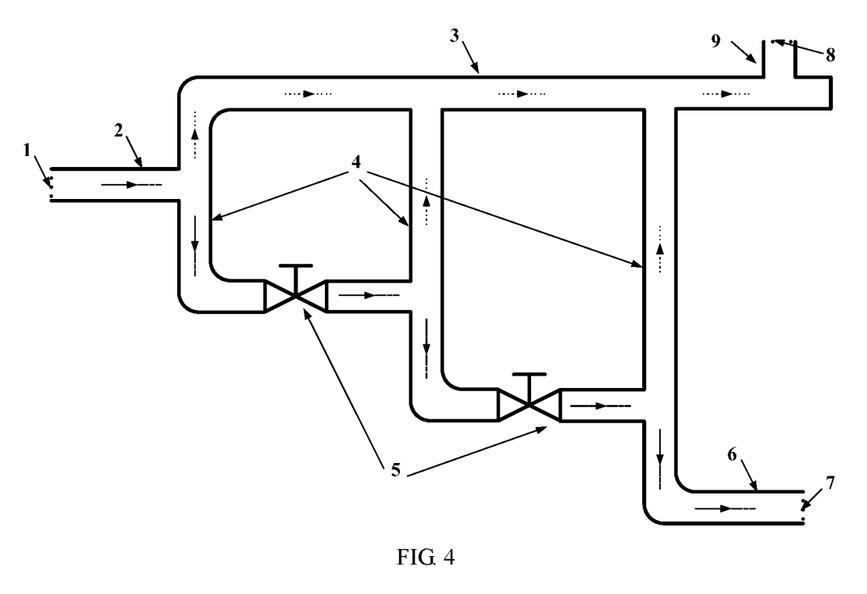
FIG. 4 is a schematic diagram of Embodiment 3 of the component regulator comprising a combined T-junctions.

FIG. 4 shows an Embodiment 3 of the impacting T-junction component regulator of the present disclosure which comprises a plurality of T-junctions shown in FIG. 1. The component regulator in this embodiment is a derivative structure of the component regulator in Embodiment 1, the structure of which is basically the same as the component regulator in Embodiment 1, except for the following difference: ports of the upper manifold trunk of the component regulator are closed, and an upper outlet pipe 9 for the manifold trunk is additionally provided on the upper manifold trunk in order to facilitate the connection to a vertical pipe in the thermodynamic system. The upper outlet pipe 9 may be provided at any position on the upper manifold trunk. The separation mechanism in Embodiment 3 is the same as that in Embodiment 1.

Figure 5:
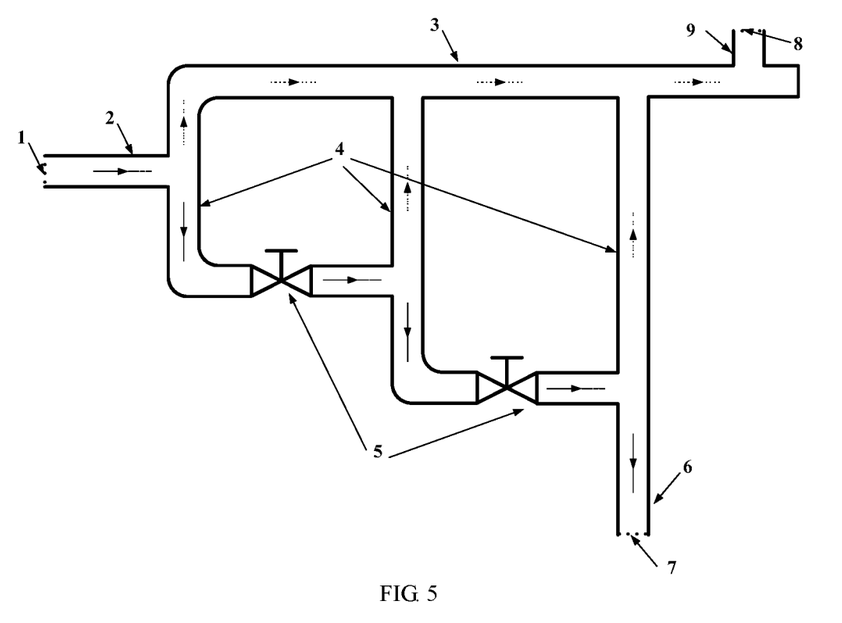
FIG. 5 is a schematic diagram of Embodiment 4 of the component regulator comprising a combined T-junctions.

FIG. 5 shows an Embodiment 4 of the impacting T-junction component regulator of the present disclosure which comprises a plurality of T-junctions shown in FIG. 1. The component regulator in this embodiment is a derivative structure of the component regulator in Embodiment 3, the structure of which is basically the same as the component regulator in Embodiment 3, except for a difference that the rich-liquid phase outlet of the component regulator is a lower outlet arranged downward perpendicularly of the last T-junction in order to facilitate the connection to a pipe arranged perpendicularly in the thermodynamic system. The separation mechanism in Embodiment 4 is the same as that in Embodiment 3.

The present disclosure will be further described in detail with reference to the accompanying drawings. These accompanying drawings are simplified schematic diagrams merely for illustratively describing the basic structure of the present disclosure, so only constitutes related to the present disclosure are shown in the accompanying drawings. The experimental equipment and experimental method will be described below.

Figure 6:
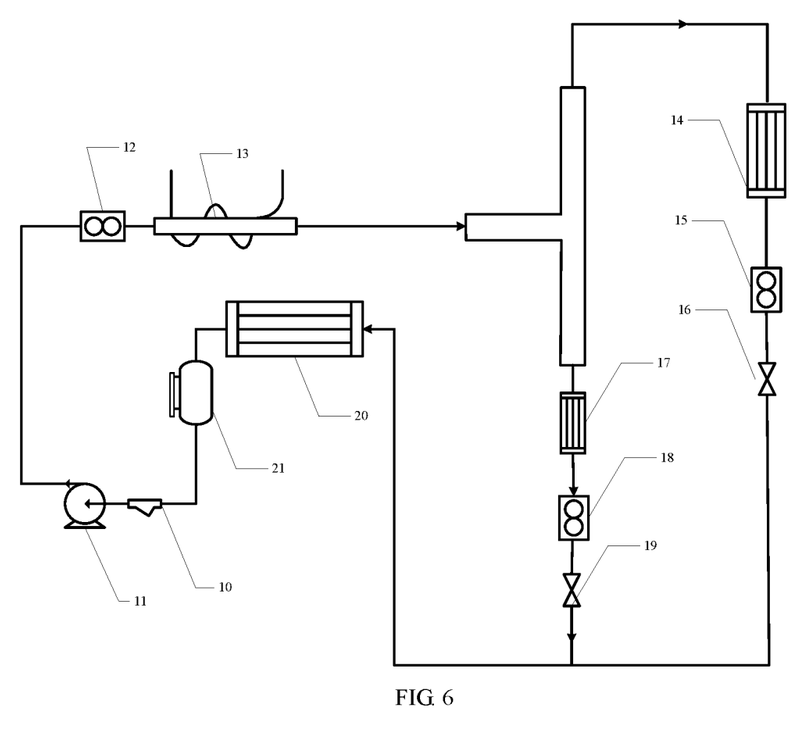
FIG. 6 is a flowchart of an experiment for testing constituent separation effects of a working medium in the device of the present disclosure.

FIG. 6 is a flowchart of an experiment for testing constituent separation of a working medium in the device of the present disclosure. A working medium in a liquid storage tank 21 is pressurized by a working medium pump 11, and then flows through a mass flow meter 12 and a heating pipe 13 to form a vapor-liquid mixture; the vapor-liquid mixture then enters the horizontal inlet pipe of the T-junction, and valves 16 and 19 at the upper and lower outlets of the T-junction are regulated to control the flow distribution proportion of the two outlets so as to optimize the component separation efficiency of the T-junction. The vapor-liquid mixtures at the upper and lower outlets are condensed into saturated fluid by condensers 14 and 17, respectively, and then flow through mass flow meters 15 and 18, are then mixed and flow to the liquid storage tank through a condenser 20. The flow meters used in the experiment of the present disclosure can measure the mass flow of the mixture per unit time, and can also measure the density as well, so that the proportion of components can be obtained according to the physical properties of the mixture. The experimental data of this system can be evaluated by the component separation efficiency indexes proposed by Professor ZHAO Li in 2016 (Zheng N, Hwang Y b, Zhao L, Deng S. Experimental study on the distribution of constituents of binary zeotropic mixtures in vertical impacting T-junction [J]. International Journal of Heat and Mass Transfer, 97(1), 242-252).

Figure 7:
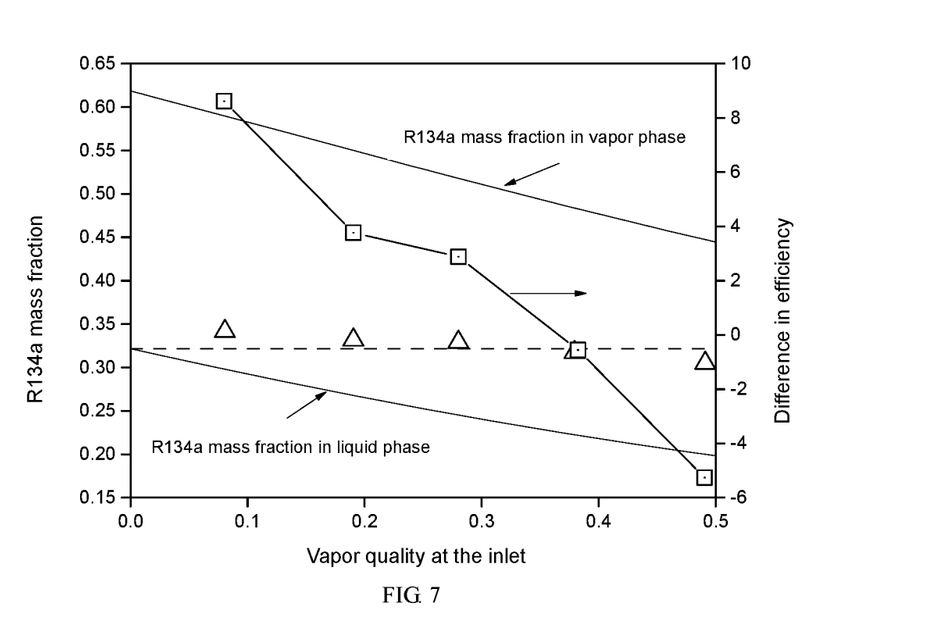
FIG. 7 is the diagram showing the concentration separation of a working medium R134a/R245fa in the T-junction regulator.

Component separation is performed by the single T-junction regulator shown in FIG. 1. A non-azeotropic mixture is formed from two working mediums R134a/R245fa, and the proportion of vapor and liquid components in the working medium is continuously regulated by a single T-junction. When the diameter ratio of the inlet and outlet pipes of the T-junction is 0.457, the mass flow rate of the working medium at the inlet is 200 $Kgm^{-2}s^{-1}$, and the mass fraction of the component R134a in the working medium at the inlet is 0.3215; at this moment, the change in the mass fraction of the component R134a at the lower outlet of the T-junction and the difference in separation efficiency of components R134a and R245fa with the inlet vapor quality of the working medium at the inlet is shown in FIG. 7. In FIG. 7, the horizontal coordinate represents the vapor quality of the working medium at the inlet of the T-junction in this experiment; the left vertical coordinate represents the mass fraction of the component R134a; the right vertical coordinate represents the difference in separation efficiency of the components R134a and R245fa for purpose of evaluating the component separation effect of the T-junction; the oblique line represents the mass fraction of the vapor/liquid-phase component R134a at different vapor qualities; the dashed line represents the mass fraction of the component R134a in the working medium at the inlet; the triangle represents the mass fraction of the component R134a at the lower outlet of the T-junction at the corresponding vapor qualities; and, the box represents the difference in component separation efficiency at the corresponding vapor qualities. It can be seen from FIG. 7 that, with the increase of the vapor quality at the inlet, the mass fraction of the component R134a at the lower outlet decreases gradually, and the efficiency difference becomes a negative value from a positive value. It is indicated that the increase of the vapor quality at the inlet will gradually increase the mass fraction of the component R245fa at the lower outlet.

Figure 8:
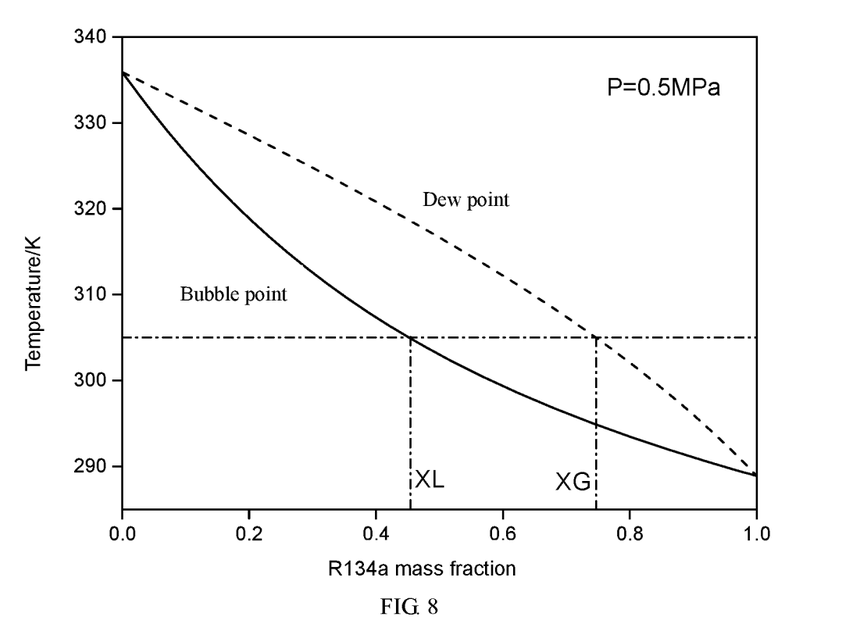

For combined T-junctions, at certain pressure and temperature, FIG. 8 shows a significant difference in the proportion of vapor and liquid components R134a/R245fa. In FIG. 8, the horizontal coordinate represents the mass fraction of the working medium R134a in the working medium R134a/R245fa; the vertical coordinate represents the temperature of the working medium in a phase equilibrium; the dashed line represents the dew point temperature of the corresponding component; the solid line represents the buddle point temperature; and, intersections of the dot-and-dash line with the dashed line and the solid line correspond to the proportions XG and XL of the vapor and liquid components at the same pressure and the same temperature, respectively. It can be seen from FIG. 8 that the proportion of components at different pressure and temperature are also different. Therefore, in the combined T-junctions, the pressure and temperature of the working medium at an intermediate lower outlet is changed by throttling, so that the proportion of the vapor and liquid components in the working medium is changed continuously. Moreover, by separating components for multiple times, the component regulation can be realized in a large range.

In conclusion, the component regulator of the present disclosure adopts characteristics of unequal vapor and liquid components in the non-azeotropic working medium and mal-distribution of two phase flows by vertical impacting T-junctions, and mainly comprises impacting T-junctions and vapor/liquid phase throttle valves, so that the fluid flows through a plurality of T-junctions and throttle valves at one time to achieve the purpose of separating components. For a single T-junction, components at upper and lower outlets can be continuously regulated between vapor and liquid components; while for combined T-junctions, the proportion of vapor and liquid components in the mixture is continuously changed due to the throttling and depressurization effects of throttle valves, so that the range of component change is wider, and regulation efficiency is improved significantly. The regulator is simple in structure, intensive, low in cost, safe, high in component regulation efficiency, and convenient for installation on a pipeline, replacement and maintenance, and the like.

Although the present disclosure has been described above with reference to the accompanying drawings, the present disclosure is not limited to the foregoing specific implementations. These specific implementations are merely illustrative but not limiting. Various transformations can be made by a person of ordinary skill in the art under the teaching of the present disclosure without departing from the tenet of the present disclosure, and those transformations shall fall into the protection scope of the present disclosure.

What is claimed is:

1. An impacting T-junction component regulator for regulating components of a non-azeotropic working medium, comprising:
    a front T-junction comprising:
    an inlet pipe arranged horizontally, and
    an outlet pipe intersected and communicated with the inlet pipe, the outlet pipe comprising an upper outlet pipe section located above the inlet pipe and a lower outlet pipe section located below the inlet pipe,
    wherein one end of the inlet pipe is a mixture inlet, while the other end thereof is communicated with the outlet pipe; and an upper port of the upper outlet pipe section is an upper outlet, while a lower port of the lower outlet pipe section is a lower outlet;
    wherein the impacting T-junction component regulator further comprises a T-junction array comprising two or more connected T-junctions, wherein the front T-junction is placed in the front of the T-junction array,
    the lower outlet of the front T-junction is connected to a mixture inlet of a T-junction connected thereto;
    the upper outlet of each T-junction is communicated with an upper manifold trunk;
    the mixture inlet of the front T-junction is a mixture inlet of the regulator;
    a lower port of a lower outlet pipe section of the last T-junction is a rich-liquid phase outlet of the regulator; one end of the upper manifold trunk is connected to the upper outlet of the front T-junction, while the other end thereof is a rich-vapor phase outlet of the regulator; and
    wherein after the non-azeotropic working medium enters the mixture inlet of the regulator, the non-azeotropic working medium is divided into two branches, one of which is a rich-liquid phase of the non-azeotropic working medium which successively flows through the lower outlets of each T-junction and then flows out from the rich-liquid phase outlet of the regulator, and the other one of which is a rich-vapor phase of the non-azeotropic working medium which is discharged from the upper outlet of the front T-junction, then gathered by the upper manifold trunk and discharged from the rich-vapor phase outlet of the regulator.

2. The impacting T-junction component regulator according to claim 1, wherein in two adjacent T-junctions, a throttle valve is provided at a junction of the lower outlet pipe section of the upstream T-junction and the inlet pipe of the downstream T-junction.

3. The impacting T-junction component regulator according to claim 1, wherein the rich-liquid phase outlet of the regulator comprises a lower outlet pipe section that is horizontally oriented.

4. The impacting T-junction component regulator according to claim 1, wherein the rich-vapor phase outlet of the regulator is connected to an upper outlet pipe having an upward opening.

\* \* \* \* \*